Patented May 26, 1931

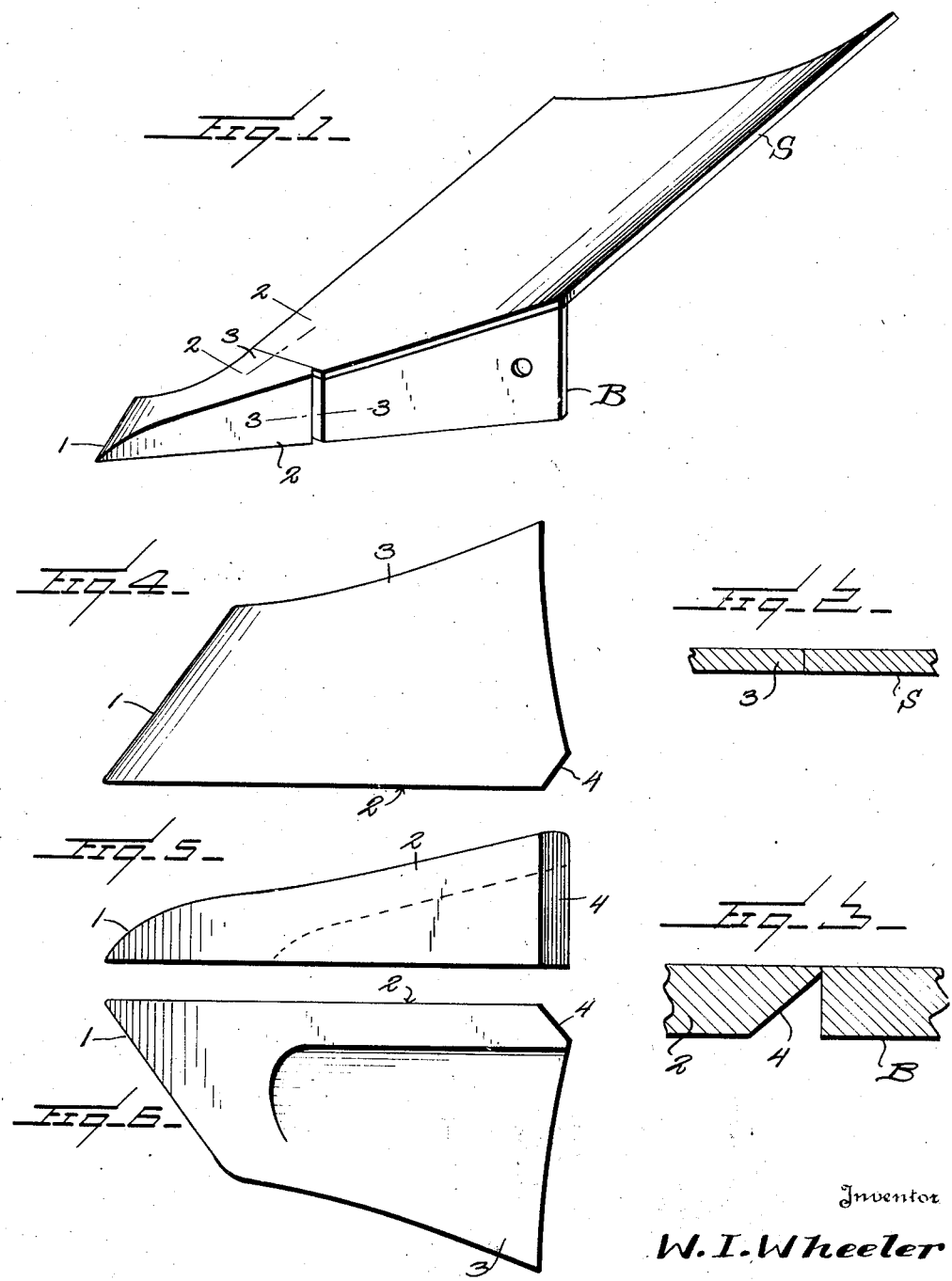

1,807,459

UNITED STATES PATENT OFFICE

WILLIAM ISIAH WHEELER, OF SCOTTVILLE, ILLINOIS

REPAIR NOSE FOR PLOWSHARES

Original application filed August 31, 1929, Serial No. 389,832. Divided and this application filed April 17, 1931. Serial No. 530,936.

This invention relates to a repair nose for plow shares and it is an object of the invention to provide a device of this kind which may be effectively attached to a share by welding.

The invention consists in the details of construction and in the combination and arrangement of the several parts of my improved repair nose for plow shares whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in perspective illustrating a repair nose constructed in accordance with an embodiment of my invention and in applied position, the welding however being unapplied;

Figure 2 is a detailed sectional view taken substantially on the line 2—2 of Figure 1;

Figure 3 is a detailed sectional view taken substantially on the line 3—3 of Figure 1;

Figure 4 is a view in top plan of the repair nose as herein disclosed unapplied;

Figure 5 is a view in elevation of the landside of the device as illustrated in Figure 1;

Figure 6 is a view in bottom plan of the device as illustrated in Figure 1.

As illustrated in the accompanying drawings, my improved repair nose comprises a body of metal forged or otherwise formed of a predetermined fixed formation and which embodies a point 1 which has formed therewith a landside bar 2 and a share portion 3. The inner end portion of the landside bar 2 is disposed on an inward and rearward bevel, as at 4.

In applying my improved repair nose the share S proper is measured to determine the point where the landside bar B of the share proper is the same width as the inner end of the bar 2 of the repair nose. The share S proper and the bar B are then cut off at such point, thus assuring the proper fitting or placement of the repair nose. The repair nose is then securely affixed to the share S and bar B by any preferred welding process and which welding operation is materially facilitated by the beveled inner end portion 4 of the bar 2. This bevel is preferably on an angle of forty-five degrees and is of especial advantage when the desired attaching of the repair nose is by means of butt-welding or where a fillet rod is used in connection with any desired welding process.

From the foregoing description it is thought to be obvious that a repair nose for plow shares constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An initially formed repair nose for plow shares comprising a landside portion and a share portion, each of said portions being adapted to be welded in abutting relation to the cut off forward end of a plow share.

2. An initially formed repair nose for plow shares comprising a landside portion and a share portion, each of said portions being adapted to be welded in abutting relation to the cut off forward end of a plow share, a marginal portion of the landside bar being beveled.

In testimony whereof I hereunto affix my signature.

WILLIAM ISIAH WHEELER.